(12) United States Patent
Nettis et al.

(10) Patent No.: US 9,416,918 B2
(45) Date of Patent: Aug. 16, 2016

(54) PRESSURE VESSEL WITH COMPOSITE BOSS HAVING GALVANIC CORROSION PROTECTION

(75) Inventors: Francesco Nettis, London (GB); Brian Spencer, Sacramento, CA (US); Zachary Spencer, Sacramento, CA (US)

(73) Assignee: BLUE WAVE CO S.A., Luxembourg (LU)

( * ) Notice: Subject to any disclaimer, the term of this patent is extended or adjusted under 35 U.S.C. 154(b) by 0 days.

(21) Appl. No.: 14/362,578

(22) PCT Filed: Dec. 5, 2011

(86) PCT No.: PCT/EP2011/071809
§ 371 (c)(1),
(2), (4) Date: Dec. 18, 2014

(87) PCT Pub. No.: WO2013/083173
PCT Pub. Date: Jun. 13, 2013

(65) Prior Publication Data
US 2015/0096993 A1    Apr. 9, 2015

(51) Int. Cl.
*F17C 1/16*    (2006.01)

(52) U.S. Cl.
CPC ........... *F17C 1/16* (2013.01); *F17C 2201/0109* (2013.01); *F17C 2201/0119* (2013.01); *F17C 2201/0128* (2013.01); *F17C 2201/0133* (2013.01); *F17C 2201/052* (2013.01); *F17C 2203/0604* (2013.01); *F17C 2203/066* (2013.01); *F17C 2203/0619* (2013.01); *F17C 2203/0663* (2013.01); *F17C 2203/0673* (2013.01); *F17C 2203/0675* (2013.01); *F17C 2205/0305* (2013.01); *F17C 2205/0379* (2013.01); *F17C 2205/0397* (2013.01); *F17C 2209/2163* (2013.01); *F17C 2221/012* (2013.01); *F17C 2221/013* (2013.01); *F17C 2221/033* (2013.01); *F17C 2221/035* (2013.01); *F17C 2223/0123* (2013.01); *F17C 2223/036* (2013.01); *F17C2260/017* (2013.01); *F17C 2260/053* (2013.01); *F17C 2270/0105* (2013.01); *Y02E 60/321* (2013.01)

(58) Field of Classification Search
CPC ................................. F17C 1/16; F17C 13/001
USPC ........... 220/601, 582, 581, 586, 62.22, 62.21, 220/560.12, 560.11, 560.04; 206/0.6
See application file for complete search history.

(56) References Cited

U.S. PATENT DOCUMENTS 2,744,043 A * 5/1956 Ramberg .............. B29C 53/602
156/155
2,988,240 A * 6/1961 Hardesty ................... F17C 1/16
156/169

(Continued)

FOREIGN PATENT DOCUMENTS

DE        102009014057 A1    9/2010

OTHER PUBLICATIONS

International Search Report for Application No. PCT/EP2011/071809, mailed Oct. 25, 2012 (4 pages).

*Primary Examiner* — Robert J Hicks
(74) *Attorney, Agent, or Firm* — Squire Patton Boggs (US) LLP

(57) ABSTRACT

The present invention is directed to a protected pressure vessel comprising a one-piece electrically conductive composite boss that is isolated from contact with materials that have an electrical potential that differ from that of the conductive composite boss so as to substantially eliminate the possibility of galvanic corrosion cause by the differences in electrical potential.

14 Claims, 7 Drawing Sheets

(56) References Cited

U.S. PATENT DOCUMENTS

| | | | | |
|---|---|---|---|---|
| 2,995,011 A | * | 8/1961 | Kimmel | F02K 9/34 102/285 |
| 3,476,283 A | * | 11/1969 | Carson | B01J 3/002 196/133 |
| 3,525,452 A | * | 8/1970 | Hofmann | F17C 13/001 174/17.05 |
| 3,891,118 A | * | 6/1975 | Laurizio | B65D 39/08 220/288 |
| 4,785,956 A | * | 11/1988 | Kepler | B29C 53/605 138/30 |
| 5,568,878 A | | 10/1996 | LeBreton | |
| 5,758,796 A | * | 6/1998 | Nishimura | F17C 1/06 220/590 |
| 5,938,209 A | | 8/1999 | Sirosh et al. | |
| 6,190,481 B1 | * | 2/2001 | Iida | B29C 70/382 156/153 |
| 6,510,959 B1 | * | 1/2003 | Van Newenhizen | B65D 90/046 220/327 |
| 8,038,029 B2 | * | 10/2011 | Lindner | B29C 70/32 220/588 |
| 2009/0071930 A1 | | 3/2009 | Sato et al. | |
| 2009/0127271 A1 | * | 5/2009 | Muraoka | B21J 5/02 220/586 |
| 2009/0203845 A1 | * | 8/2009 | Fukui | B29C 45/006 525/190 |
| 2011/0220661 A1 | | 9/2011 | Strack | |

* cited by examiner

PRESSURE VESSEL WITH COMPOSITE BOSS HAVING GALVANIC CORROSION PROTECTION

FIELD

This invention relates to a method of protecting pressure vessels comprising electrically conductive composite bosses against galvanic corrosion.

BACKGROUND

The detrimental effects of the burning of fossil fuels on the environment are becoming more and more of a concern and have spurred great interest in alternative energy sources. While progress is being made with solar, wind, nuclear, geothermal, and other energy sources, it is quite clear that the widespread availability of economical alternate energy sources, in particular for high energy use applications, remains an elusive target. In the meantime, fossil fuels are forecast to dominate the energy market for the foreseeable future. Among the fossil fuels, natural gas is the cleanest burning and therefore the clear choice for energy production. There is, therefore, a movement afoot to supplement or supplant, as much as possible, other fossil fuels such as coal and petroleum with natural gas as the world becomes more conscious of the environmental repercussions of burning fossil fuels. Unfortunately, much of world's natural gas deposits exist in remote, difficult to access regions of the planet. Terrain and geopolitical factors render it extremely difficult to reliably and economically extract the natural gas from these regions. The use of pipelines and overland transport has been evaluated, in some instances attempted, and found to be uneconomical. Interestingly, a large portion of the earth's remote natural gas reserves is located in relatively close proximity to the oceans and other bodies of water having ready access to the oceans. Thus, marine transport of natural gas from the remote locations would appear to be an obvious solution. The problem with marine transport of natural gas lies largely in the economics. Ocean-going vessels can carry just so much laden weight and the cost of shipping by sea reflects this fact, the cost being calculated on the total weight being shipped, that is, the weight of the product plus the weight of the container vessel in which the product is being shipped. If the net weight of the product is low compared to the tare weight of the shipping container, the cost of shipping per unit mass of product becomes prohibitive. This is particularly true of the transport of compressed fluids, which conventionally are transported in steel cylinders that are extremely heavy compared to weight of contained fluid. This problem has been ameliorated somewhat by the advent of Type III and Type IV pressure vessels. Type III pressure vessels are comprised of a relatively thin metal liner that is wound with a filamentous composite wrap, which results in a vessel with the strength of a steel vessel at a substantial saving in overall vessel weight. Type IV pressure vessels comprise a polymeric liner that is likewise wrapped with a composite filamentous material. Type IV pressure vessels are the lightest of all the presently approved pressure vessels. The use of Type III and Type IV vessels coupled with the trend to make these vessels very large—cylindrical vessels 18 meters in length and 2.5-3.0 meters in diameter are currently being fabricated and vessel 30 or more meters in length and 6 or more meters in diameter are contemplated—has resulted in a major step forward in optimizing the economics of ocean transport of compressed fluids.

All pressure vessels require at least one end fitting, called a "boss," for connecting the vessel to external paraphernalia for loading and unloading fluids into and out of the vessel. Bosses in current use are generally made of metals such as stainless steel, nickel alloys, aluminum, brass and the like. Unfortunately, bosses, in particular with regard to larger pressure vessels, are extremely heavy, by some estimates comprising as much as 70% of the weight of a Type III or Type IV pressure vessel. Further, large metal bosses are difficult to manufacture and tend to be expensive, often costing $100,000 or more. These factors have a huge negative effect on the economics, and thereby the viability, of ocean transport of compressed fluids. A polymeric composite boss would substantially lighten any of the classes of vessels, in particular Type III and Type IV vessels.

In copending patent application Ser. No. 14/362,477, which is incorporated by reference as if fully set forth herein, such composite boss is disclosed.

A presently preferred filler for use in the composite from which the above boss may be fabricated is fibrous or filamentous carbon. Since composites with fibrous carbon filler are electrically conductive, i.e., have an electrical potential, a problem may arise due to galvanic corrosion if the composite comes in contact with a substance having a different electrical potential, particularly in the presence of a conductive atmosphere such as would be found in salt-laden moist sea air encountered during marine transport.

Thus, what is needed is a method of preventing carbon fiber or filament composite bosses from participating in galvanic corrosion. This application is directed to such a method.

SUMMARY

Thus, in one aspect the instant invention is directed to a pressure vessel, comprising:
a non-conductive polymeric pressure vessel liner; and
a one-piece composite boss comprising an electrically conductive fibrous or filamentous material; wherein:
   the non-conductive liner is contiguous to an inner surface of the composite boss, separating the inner surface of the boss from a compressed fluid contained in the pressure vessel; and
   the non-conductive liner is also contiguous to a proximal end surface of the boss, physically and electrically separating the end surface from galvanic corrosion-inducing contact with materials external to the pressure vessel.

In an aspect of this invention, the non-conductive liner comprises a dielectric polymer.

In an aspect of this invention, the dielectric polymer is a thermoplastic polymer.

In an aspect of this invention, thermoplastic polymer comprises polyethylene.

In an aspect of this invention, the dielectric polymer is a thermoset polymer.

In an aspect of this invention, the thermoset polymer is made from a prepolymer formulation comprising at least 92% pure dicyclopentadiene.

In an aspect of this invention, the composite boss comprises a thermoset polymer matrix.

In an aspect of this invention, the thermoset polymer matrix is selected from the group consisting of epoxy resins, polyester resins, vinyl ester resins, polyimides, dicyclopentadiene resins and combinations thereof.

In an aspect of this invention, the thermoset polymer matrix is made from a prepolymer formulation comprising at least 92% pure dicyclopentadiene.

In an aspect of this invention, the electrically conductive fibrous or filamentous material comprises carbon fibers or filaments.

In an aspect of this invention, the vessel is used for the containment and transport of compressed natural gas, CNG.

In an aspect of this invention, the CNG comprises raw natural gas.

DETAILED DESCRIPTION

Brief Description of the Figures

The figures shown are provided for illustrative purposes only and are not intended nor should they be construed as limiting this invention in any manner whatsoever.

FIG. 1 shows various configurations of pressure vessels that can include composite bosses made with carbon fiber or filament in the composite. The vessels are shown with an aperture where a conductive composite boss would be inserted.

DISCUSSION

Figure 1A:
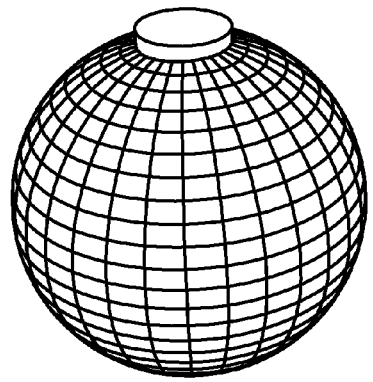
FIG. 1A shows a spherical pressure vessel.
Figure 1B:
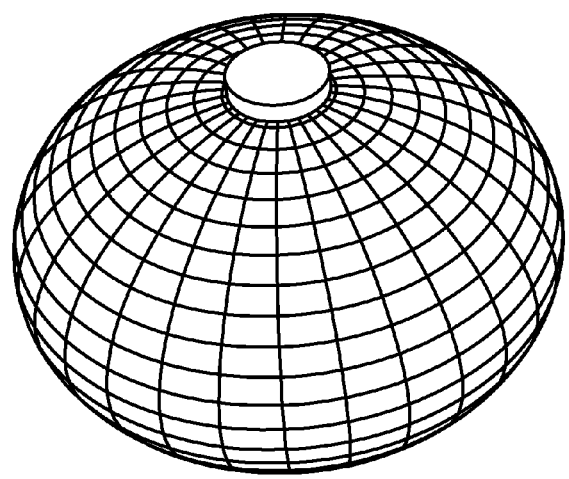
FIG. 1B shows an oblate spheroidal pressure vessel.
Figure 1C:
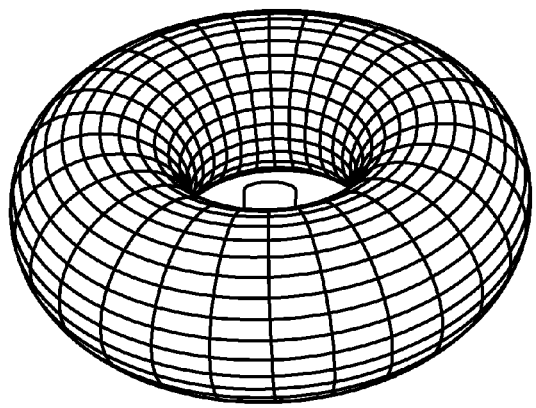
FIG. 1C shows a toroidal pressure vessel.
Figure 1D:
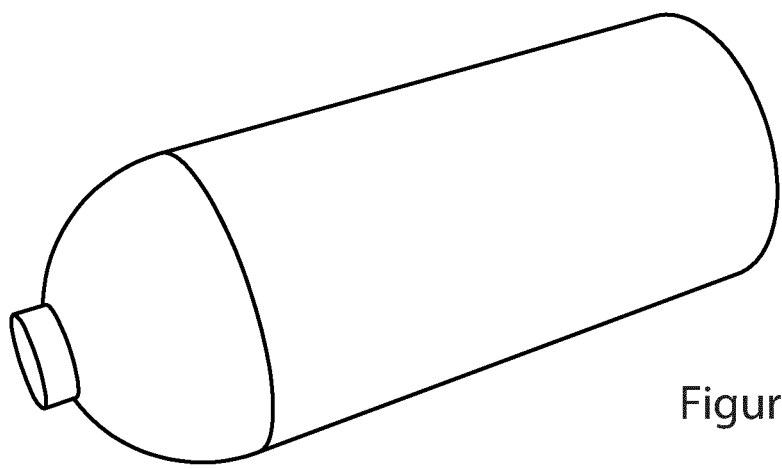
FIG. 1D shows a pressure vessel comprising a hollow elongate cylinder with one domed end section.
Figure 1E:
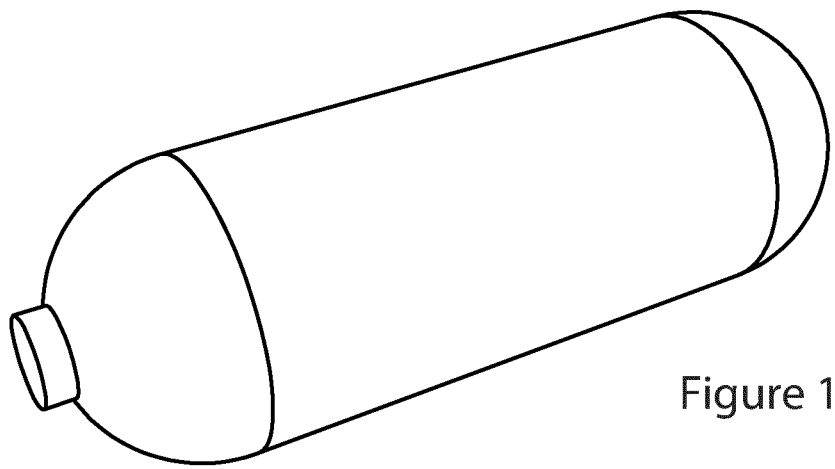
FIG. 1E shows a pressure vessel comprising a hollow elongate cylinder with two domed end sections.

It is understood that, with regard to this description and the appended claims, any reference to any aspect of this invention made in the singular includes the plural and vice versa unless it is expressly stated or unambiguously clear from the context that such is not intended.

As used herein, any term of approximation such as, without limitation, near, about, approximately, substantially, essentially and the like, mean that the word or phrase modified by the term of approximation need not be exactly that which is written but may vary from that written description to some extent. The extent to which the description may vary will depend on how great a change can be instituted and have one of ordinary skill in the art recognize the modified version as still having the properties, characteristics and capabilities of the word or phrase unmodified by the word of approximation. In general, but with the preceding discussion in mind, a numerical value herein that is modified by a word of approximation may vary from the stated value by ±10%, unless expressly stated otherwise.

The terms "proximal" and "distal" simply refer to the opposite ends of a construct and are used as a method of orienting the features of an object with regard to one another or in relation to another object, e.g., the features of a boss and the position of the parts of the boss with regard to a vessel liner. In general, which end is designated as proximal and which is designated as distal is purely arbitrary unless the context unambiguously expresses otherwise.

As used herein, the use of "preferred," "preferably," or "more preferred," and the like refers to preferences as they existed at the time of filing of this patent application.

As used herein, "contiguous" refers to two surfaces that are adjacent and that are in direct contact or that would be in contact were it not for an intervening layer of material.

As used herein, "impenetrable" or "impervious" refer to the property of a substance that renders it for all intents and purposes impossible for a fluid to penetrate to any significant degree into a surface formed of the first substance.

As used herein, "inert" refers to the property of a substance that renders a surface formed of the substance chemically unreactive toward a fluid or any component thereof that may come in contact with the surface.

As used herein, a "fluid" refers to a gas, a liquid or a mixture of gas and liquid. For example, without limitation, natural gas as it is extracted from the ground and transported to a processing center is often a mixture of the gas with liquid contaminants. Such mixture would constitute a fluid for the purposes of this invention.

As used herein, a "wrap" or "over-wrap" refers to the winding of a filamentous material around a construct, which may be, without limitation, cylindrical, geodesic, toroidal, spherical or oblate spheroidal as illustrated in FIG. 1. The filamentous material may be wound around the construct in a dry state and left as such, it may subsequently be impregnated with a polymer or it may be impregnated with a polymer prior to being wound onto the construct.

As used herein, the term "polar" simply refers to the end of a center-line through a structure about which center-line the structure is at least substantially symmetrical. Thus, in FIG. 3A, point 108 is the polar end of centerline 105. A structure that is said to be in a polar orientation is located at a polar end of a center-line and is at least substantially symmetrically disposed about the center-line. For example, risers 138 and 139 at either end of the pressure vessel 100 in FIG. 3A could be described as "polar risers" and the opening in each riser could be described as a "polar opening."

As used herein, the term "dielectric" has it normal meaning as understood by those skilled in the art. Briefly, a dielectric is an electrical insulator that can be polarized by an electric field. For the purposes of this invention, the term includes any insulating material.

As used herein, a "polymeric composite" has the meaning that would be ascribed to it by those skilled in the art. In brief, it refers to a fibrous or filamentous material that is impregnated with, enveloped by or both impregnated with and enveloped by a polymer matrix material.

As used herein, a "boss" refers to a device as such would be understood by those skilled in the art. In brief, a "boss" is a device used to connect a pressure vessel with external piping through which the pressure vessel is filled or emptied with a fluid.

Pressure vessels for the transport of compressed fluids, such as compressed natural gas, CNG, presently constitute four regulatory agency approved classes, all of which are cylindrical with one or two domed ends:

Class I. Comprises an all metal, usually aluminum or steel construct. This type of vessel is inexpensive but is very heavy in relation to the other classes of vessels. Although Type I pressure vessels currently comprise a large portion of the containers used to ship compressed fluids by sea, their use in marine transport incurs very tight economic constraints.

Class II. Comprises a thinner metal cylindrical center section with standard thickness metal end domes in which only the cylindrical portion is reinforced with a composite wrap. The composite wrap generally constitutes glass or carbon filament impregnated with a polymer matrix. The composite is usually "hoop wrapped" around the middle of the vessel. The domes at one or both ends of the vessel are not composite wrapped. In Class II pressure vessels, the metal liner withstands about 50% of the stress and the composite withstands about 50% of the stress resulting from the internal pressure of the contained compressed fluid. Class II vessels are lighter than Class I vessels but are more expensive.

Class III. Comprises a thin metal liner comprises the entire structure and is reinforced with a filamentous composite wrap around entire vessel. The stress in Type III vessels is shifted virtually entirely to the filamentous material of the composite wrap; the liner need only withstand a small portion of the stress. Type III vessels are much lighter than type I or II vessels but are substantially more expensive.

Class IV. Comprises a polymeric essentially gas-tight liner fully wrapped with a filamentous composite. The composite wrap provides the entire strength of the vessel. Type IV vessels are by far the lightest of the four approved classes of pressure vessels but are also the most expensive.

While the composite boss of this invention may be used with any type of pressure vessel, it is most beneficially used with either a Type III or a Type IV pressure vessel where its use dramatically further reduces the weight of the vessel resulting in a substantial increase in the contained fluid to pressure vessel tare weight ratio and concomitant increase in the value of the fluid per unit weight of the pressure vessel.

It is to be understood that, while this invention is described primarily with regard to conductive composite bosses, the technique and end result would be applicable to any kind of conductive boss including those made of metal.

As noted above, Type II, III and IV pressure vessel require a composite wrap to give them the necessary strength to withstand the pressure exerted by a compressed fluid contained in the vessel. For a Type II pressure vessel, the wrap is relatively straight-forward and is referred by those skilled in the art as "hoop-wrapping," which is described elsewhere herein and which is very well-known to those skilled in that art. On the other hand, for Type III and Type IV pressure vessels, to produce a vessel that has the requisite strength it is necessary to wrap the vessel, sometimes in addition to hoop-wrapping, sometimes in lieu of hoop-wrapping, in a manner called "isotensoidal-wrapping," which is likewise known in the art and is also described elsewhere herein. When an entire vessel is wrapped with a composite, the underlying metal or polymeric structure is conventionally referred to as a "liner," which provides the surface on which the composite wrap is wound and which is the surface with which the contained compressed fluid is in direct contact.

For the purpose of this disclosure, only a pressure vessel liner having a composite boss integrated therewith will be described in detail in that once the liner/boss assembly is in hand, while it is hardly a trivial exercise, it is a well-established procedure to design and apply to the liner, including to the end domes, a composite comprising a filamentous material and a polymeric matrix, the end result being a completely composite-wrapped pressure vessel. In brief, for a given diameter cylindrical section of a pressure vessel liner, a given polar opening diameter and a given dome shape, a winding pattern can readily be determined using known algorithms including, without limitation, netting analysis, finite element analysis and combinations thereof. Using these mathematical formulae permits the design of a winding pattern that results is an isotensoid wrap of the vessel. The term "isotensoid" refers to the property of the fully wound vessel by which each filament of the wrap experiences a constant pressure at all points along its path. This is currently considered to be the optimal design for a composite wrapped pressure vessel because, in this configuration, virtually the entire stress imposed on the vessel by a pressurized gas is assumed by the filaments of the composite with very little of the stress being assumed by the polymeric matrix.

Dome shapes include, but are not limited to, 2:1 ellipsoidal, 3:1 ellipsoidal and geodesic. The characteristics "2:1" and "3:1" refer to the ratio of the major axis to the minor axis of an ellipse. Presently preferred, however, is a geodesic dome shape since it constitutes a surface of revolution that is amenable to numerical solution for any combination polar opening diameter, cylindrical section diameter and filament width. This numerical solution in turn permits the progressive plotting of the curvature of the dome from the diameter of the pressure vessel toward the polar opening. Knowledge of the curvature then permits the design and application of an optimal strength, i.e., isotensoidal, filament wrap to the vessel using the algorithms mentioned above. Such pressure vessels exhibit the optimal combination of highest pressure loading at the lightest overall weight.

As mentioned previously, the composite overwrap, while constituting relatively sophisticated design mathematics and implementation machinery, is well-known to those skilled in the pressure vessel design and fabrication art and any of these known techniques can be applied to a pressure vessel liner comprising a composite boss of this invention. Thus, except where aspects of composite-wrapping are relevant to elements of this invention, in which case they will be fully discussed, the design and implementation of composite vessel wraps will not be further discussed.

While the presently approved pressure vessels are primarily cylindrical in shape, many other shapes are possible and a conductive composite boss of this invention would be well-suited for use with any shape vessel. FIG. 1 shows, without limitation, a few pressure vessel shapes currently in use or contemplated for use under various conditions.

Figure 2:
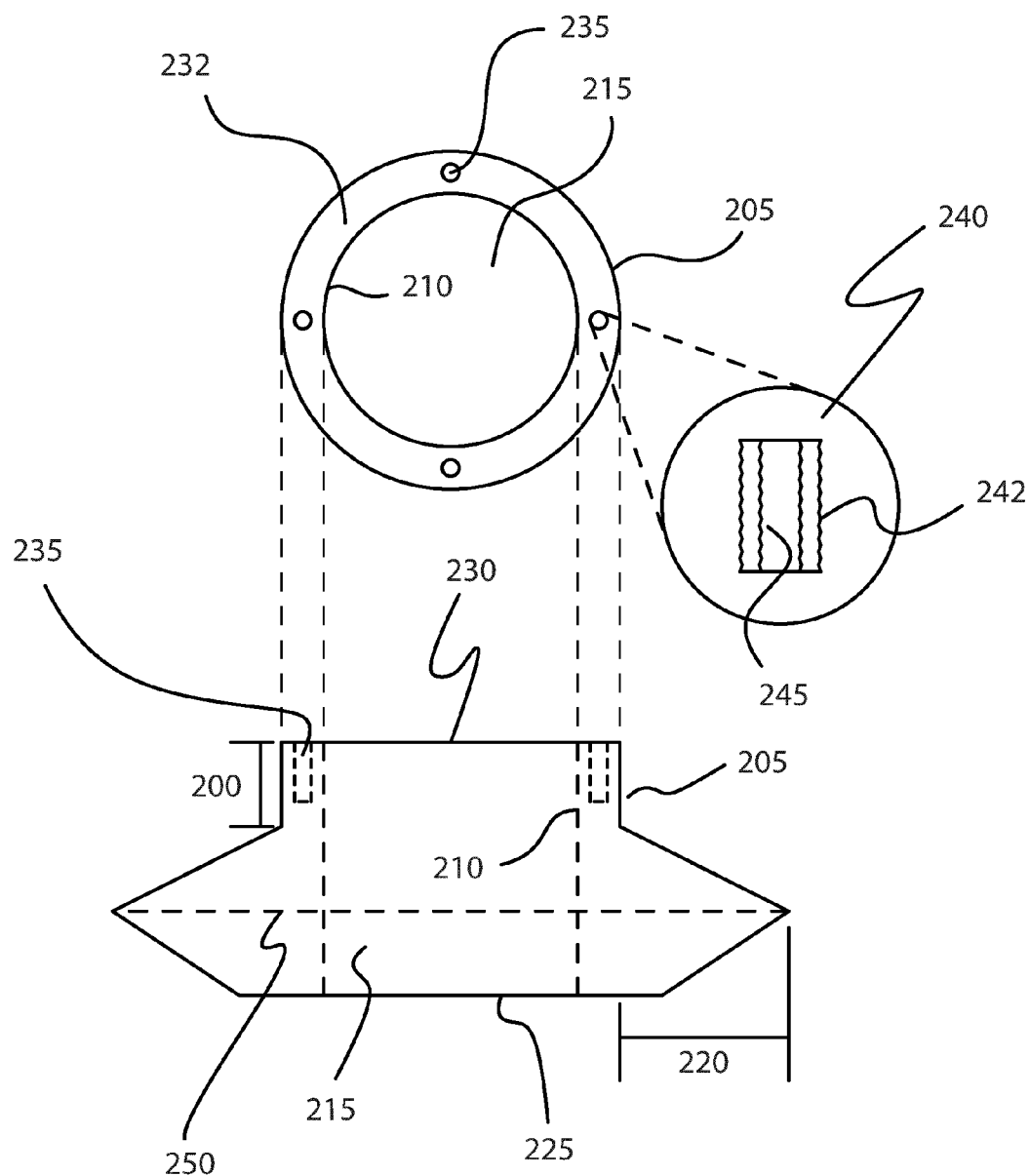
FIG. 2 is a schematic representation of a conductive composite boss of this invention.

FIG. 2 shows a one-piece conductive composite boss of this invention. The boss comprises tubular center section 200 having outer surface 205, inner surface 210, through-hole 215 and flange, sometimes referred to in the art as a "wing," 220. For the purposes of description, the flange end of the boss will be considered to be its distal end, 225 in the figure, and the other end, naturally, will be considered the proximal end, 230 in the figure. Threaded holes 235 are radially disposed around proximal end surface 232. These threaded holes may be used directly to connect the boss to a flange piece that in turn is used to couple the vessel to an external line for loading and unloading the vessel. In a presently preferred alternative threaded holes 235 form a mating surface with a diameter that is larger than that required for use with the intended fasteners. Into these oversize holes, metallic exteriorly-threaded (242) inserts 240 are screwed. The inserts comprise internal threads 245 that are sized correctly for coupling to whatever device is to be used to attach the pressure vessel to an external system for loading and unloading.

Figure 3A:
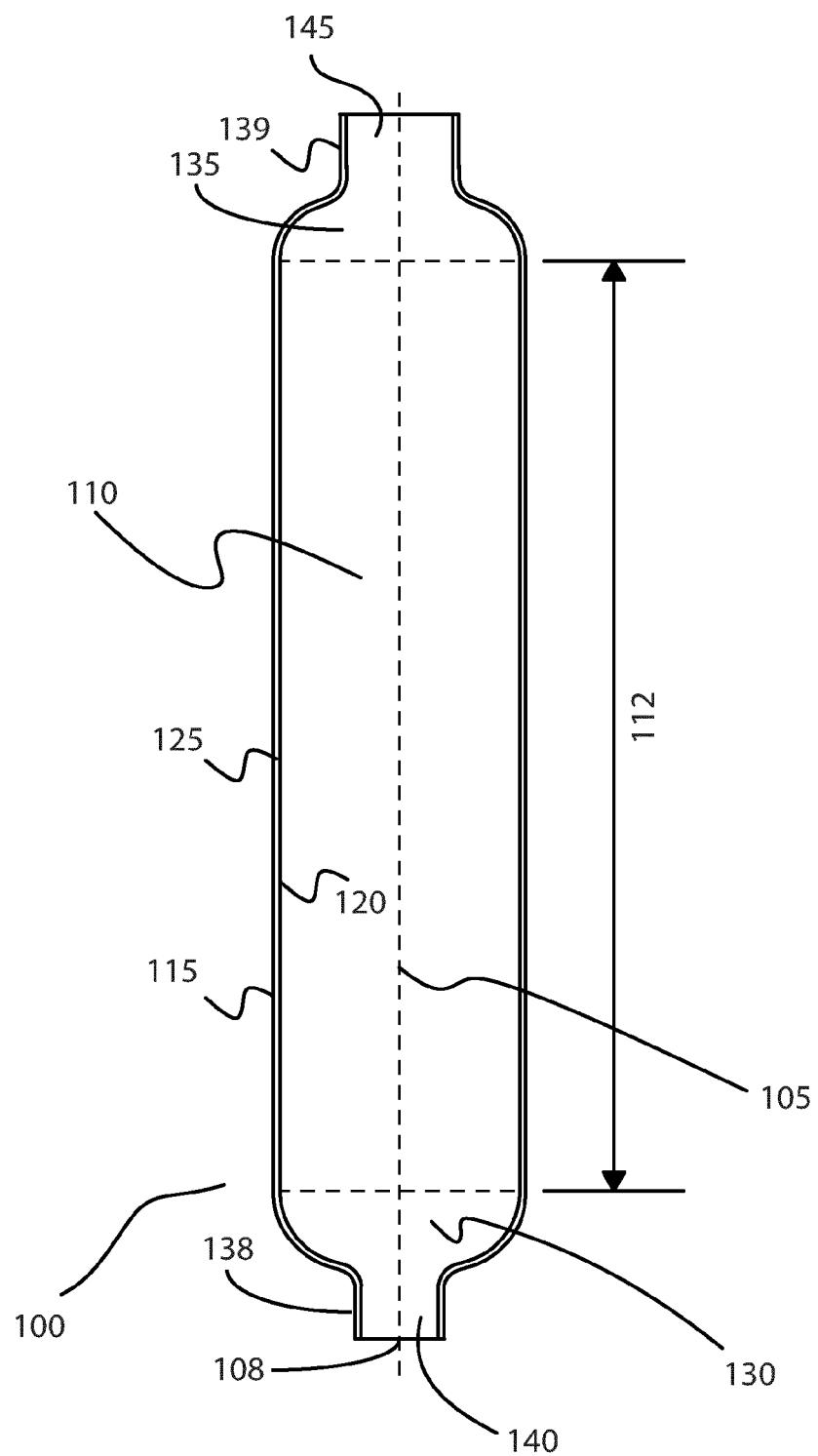
FIG. 3A is a schematic representation of a pressure vessel liner having a riser, the riser being a feature of the method of fabrication of a pressure vessel of this invention when the liner polymer is a dielectric thermoplastic.

Thus, FIG. 3A shows a schematic of pressure vessel liner 100 of this invention. The vessel liner is cylindrical in shape with domed end pieces. That is, vessel liner 100 comprises cylindrical center section 110 having length 112, outer surface 115, inner surface 120, thickness 125, domes 130 and 135 and polar risers 138 and 139 having in them polar openings 140 and 145, one at each end. The polar openings are formed as necks that are blended with the domes such that the domes form shoulders for the necks. One of the necks can be larger than the other, or they can be the same size. As illustrated, the top neck is usually the wider neck since it is typically for inspection purposes, whereas the bottom neck is usually for loading and offloading fluid.

As mentioned previously, it is within the scope of this invention that a pressure vessel of this invention may comprise a polar opening in only one of the domes. Also within the scope of this invention is a pressure vessel in which length 112 of cylindrical center section 110 approaches zero.

The domes as shown are rounded to blend from the cylinder, through the shoulders and up to a neck—the polar risers. They can also assume other curved shapes, including generally hemi-spherical shapes. With such hemi-spherical shapes in particular, the result of the length 112 of cylindrical center section 110 approaching zero is a substantially spherical pressure vessel.

The composite boss of this invention will work equally well in an oblate spheroid pressure vessel as it will in a spherical or cylindrical pressure vessel, the latter of which is a presently preferred embodiment of this invention. An oblate spheroid refers to a vessel having a shape described by an ellipse rotated about its minor axis a shown in FIG. 1B. Further the pressure vessel of this invention can also be toroidal in shape (FIG. 1C) with the conductive composite boss being fitted to an aperture in the inner contour of the torus.

Figure 3B:
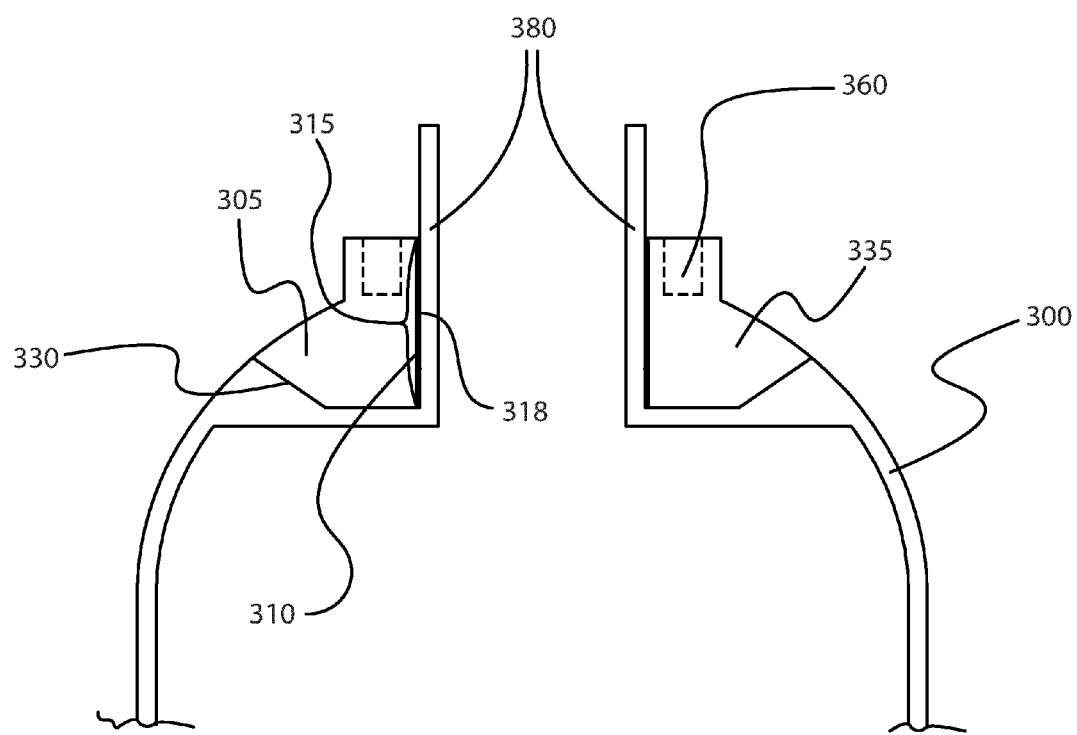
FIG. 3B is a schematic representation of the above liner with a composite boss of this invention fitted over the riser.

FIG. 3B shows a further configuration of pressure vessel that has a dome having a generally hemi-spherical shape. It has a pressure vessel liner 300 with a single piece composite boss 305 having a tubular section 315 into which a riser 380 has been inserted. As can be seen, inner surface 310 of tubular center section 315 is contiguous, that is, in direct contact with, outer surface 318 of riser 380. Also, surface 330 of flange 335 is contiguous with outer surface 318 of riser 380. In this manner, the liner material covers the entire surface of the boss and insulates it from contact with any other material other than the liner material. Boss 305 also has threaded holes 360 that, as discussed above, may be equipped with metallic threaded inserts as described with regard to FIG. 3. The holes, of course, will continue through liner 300 so that external appliances may be connected to the pressure vessel at the boss. See FIG. 3C.

Figure 3C:
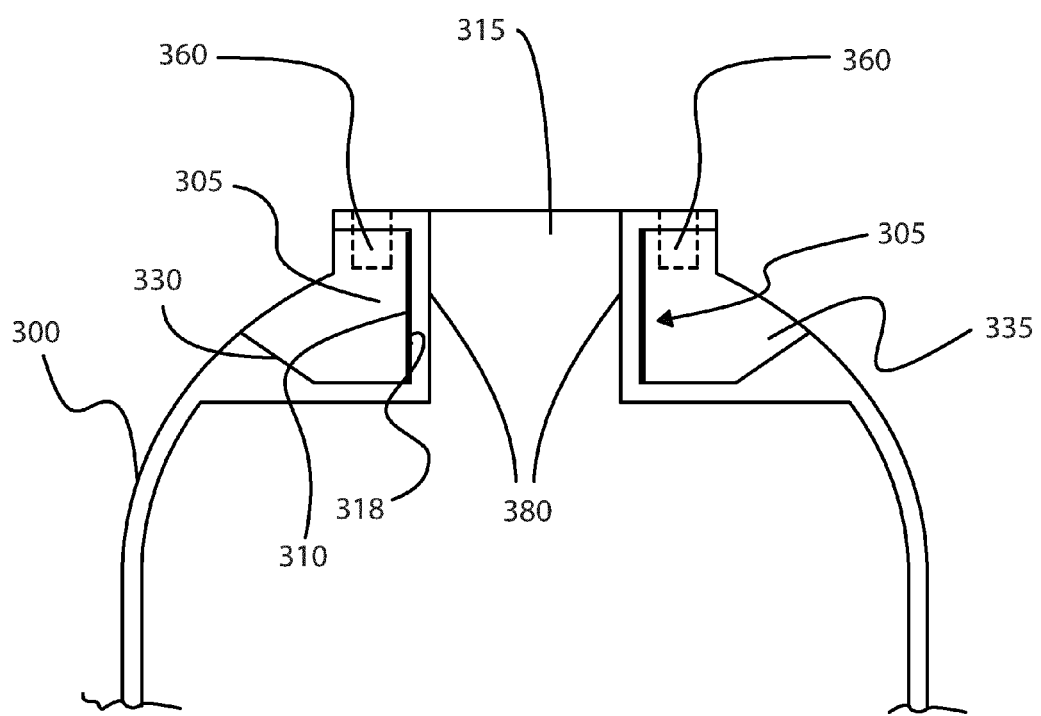
FIG. 3C is a schematic representation of the above liner after the extension of the riser has been flattened to cover the proximal end surface of the composite boss.

The manner in which a conductive boss is layered with a dielectric liner so as to prevent galvanic corrosion of the boss varies with choice of liner material. That is, if the liner is a thermoplastic polymer, the simplest way to cover the proximal surface of the boss is to have the length of the riser be such that the riser extends beyond the proximal end of the boss. Such a configuration is shown in FIG. 3B. After the vessel has been fully formed, the portion of the riser that extends beyond the proximal surface of the boss can be reheated to soften it and then molded to the contours of the proximal end of the boss as shown in FIG. 3C.

Figure 4:
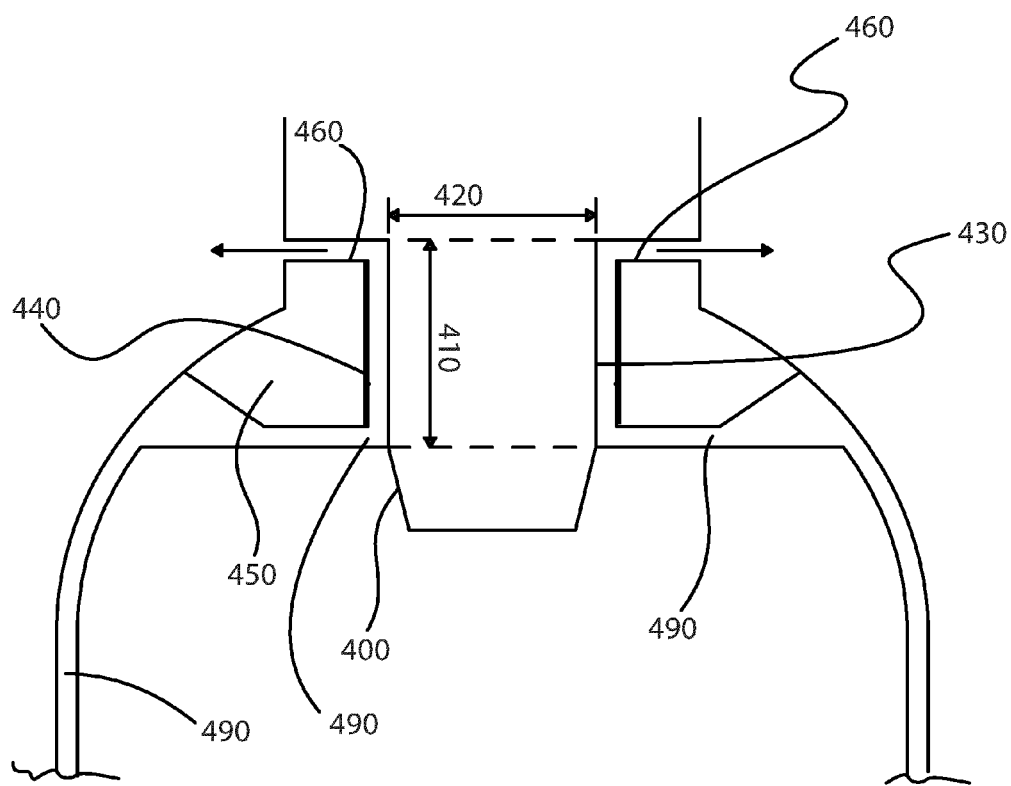
FIG. 4 is a schematic representation of a mandrel for the fabrication of a pressure vessel liner with a conductive boss and galvanic protection where the liner comprises a thermoset polymer.

On the other hand, if the liner is a thermoset polymer it would, of course, be impossible to reheat and mold a portion of the riser to conform to the proximal end of the boss. In this case, one approach to forming the liner/boss could be to use a mandrel with a cylindrical portion that fits into the central opening of the boss but which has a diameter that is less than that of the boss by the desired thickness of the liner in the area of the boss. This is illustrated in FIG. 4. When the thermoset polymer is applied to the mandrel, it fills void 490 between the mandrel and the boss such that, when it is cured, the inner and outer surfaces of the boss are covered with a layer of the dielectric thermoset liner. Mandrel 400 includes cylindrical portion 410 that has diameter 420, which is less than that of the central lumen of the boss. Mandrel 400 is positioned so that its cylindrical outer surface 430 is spaced apart from inner surface 440 of boss 450 to a desired distance so as to provide a desired thickness of liner polymer on inner surface 440 and proximal surface 460 of boss 450.

A composite boss of this invention can be fabricated from a polymeric matrix containing fibrous materials that confer additional strength on the composite. The polymeric matrix can be any polymer known to have or found to have properties consistent with use in a high pressure environment such as that found in a pressure vessel of this invention.

It is presently preferred that the composite boss comprise a polymeric matrix that results from the polymerization of a prepolymer formulation comprising dicyclopentadiene that is at least 92% pure.

While thermoplastic polymers, thermoplastic elastomers, thermoset resins and combinations thereof can be used, presently preferred are thermoset polymers, which can exhibit significantly better mechanical properties, chemical resistance, thermal stability and overall durability than other types of polymers.

A particular advantage of most thermoset plastics or resins is that their precursor monomers or prepolymers tend to have relatively low viscosities under ambient conditions of pressure and temperature therefore can be introduced into or combined with fibers and filaments quite easily.

Another advantage is that thermoset polymers can usually be cured isothermally, that is, at the same temperature at which they are combined with the fibers/filaments, which can be room temperature.

Suitable thermoset resins include, without limitation, epoxy resins, polyester resins, vinyl ester resins, polyimides, dicyclopentadiene resins and combinations thereof.

As noted above, presently preferred polymers are dicyclopentadiene resins, in particular ROMP-synthesized cyclopentadiene resins.

It is also presently preferred that the dicyclopentadiene prepolymer in a prepolymer formulation for use in fabrication of polymeric constructs herein has a purity of at least 92%, preferably at present at least 98%.

As used herein, a "prepolymer formulation" refers to a blend of at least 92% pure dicyclopentadiene with one or more reactive ethylene monomer(s), a polymerization initiator or curing agent plus any other desirable additives prior to curing.

A "polymeric construct" refers to any polymeric part of a pressure vessel of this invention, in particular liners, bosses, domed end sections and composite over-wraps.

In general, any type of fibrous or filamentous material may be used to create the polymeric composites of this invention. Such materials include, without limitation, natural (silk, hemp, flax, etc.), metal, ceramic, basalt and synthetic polymer fibers and filaments. Presently preferred materials include glass fibers, commonly known as fiberglass, carbon fibers, aramid fibers, which go mostly notably under the trade name Kevlar® and ultra-high molecular weight polyethylene, such as Spectra® (Honeywell Corporation) and Dyneeva® (Royal DSM N.V.).

It is when carbon fibers, which are presently preferred, are used that the boss exhibits an electrical potential, the carbon fibers being "conductivity-conferring" and the benefits of this invention come into play to insulate the boss from any other material having an electrical potential different from that of the boss. Of course, the invention works as well with bosses made of conductive polymers or bosses made of non-conductive polymers but which are rendered conductive by the use of any conductivity-conferring filler which includes but is not limited to carbon fibers. An example of a non-carbon fiber-containing conductive composite would be a metal fiber composite.

A pressure vessel liner of this invention may comprise a single layer or multiple layers of one or more dielectric polymers, wherein each layer may be the same as or different than each other layer, which would constitute a Type IV pressure vessel. It may also comprise a polymeric layer having on its inner surface, the surface in contact with the contained gas, a very thin layer of metal to assist with the impermeablility of the vessel to the contained gas. This thin metal layer would terminate before or at the point that the liner comes in contact with the boss. Such a pressure vessel would still be considered Type IV since the metal layer would be too thin to constitute a structural feature of the liner.

Once the dimensions of the boss herein, in particular the diameter of the flange and thickness at the shear point, have been determined using the disclosure herein, the boss itself can be fabricated using any method know in the art. For example, the boss can be milled from a solid piece of cured composite material. Or the boss can be molded using a prepolymer formulation as set forth above and techniques such as, without limitation, compression molding, reaction injection molded (RIM) or resin transfer molding (RTM), each of which is well-known to those skilled in the art and therefore requires no further elucidation.

Once the vessel liner has been formed and the boss is in place using one of the techniques discussed above, the liner can be wound with a filamentous composite to complete the pressure vessel and provide it with its ultimate strength.

A pressure vessel of this invention can be used to contain and transport any compressed fluid. A presently preferred use of a pressure vessel herein is containment and transport of CNG, which may be in its purified state or, more commonly, in its as-extracted state, which is referred to as "raw" natural gas. Raw gas refers to natural gas as it comes, unprocessed, directly from the well. It contains, of course, the natural gas (methane) itself but also may contain natural gas liquids such as condensate, natural gasoline and liquefied petroleum gas. Water may also be present as may be other gases, either in the gaseous state or dissolved in the water, such as nitrogen, carbon dioxide, hydrogen sulfide and helium. Some of these may be reactive in their own right or may be reactive when dissolved in water, such as carbon dioxide which produces an acid when dissolved in water.

A fully-formed Type IV pressure vessel comprising a conductive composite boss with galvanic corrosion protection afforded by a dielectric liner is within the scope of this invention.

The pressure vessels described herein can carry a variety of gases, such as raw gas straight from a bore well, including raw natural gas, e.g. when compressed—raw CNG or RCNG, or $H_2$, or $CO_2$ or processed natural gas (methane) or raw or part processed natural gas, e.g., with $CO_2$ allowances of up to 14 mole percent, $H_2S$ allowances up to 1,000 ppm, or $H_2$ and $CO_2$ gas impurities, or toher impiruties or corrosive species.

The preferred use, however, is CNG transportation, be that raw CNG, part processed CNG or clean CNG—processed to a standard deliverable to the end user, e.g. commercial, industrial or residential.

CNG can include various potential component parts in a variable mixture of ratios, some in their gas phase and others in a liquid phase, or a mix of both. Those component parts will typically comprise one or more of the following compounds: $C2H6$, $C3H8$, $C4H10$, $C5H12$, $C6H14$, $C7H16$, $C8H18$, $C9+$ hydrocarbons, $CO2$ and $H2S$, plus potentially toluene, diesel and octane in a liquid state, and other impurities/species.

The present invention has therefore been described above purely by way of example. Modifications in detail may be made to the invention within the scope of the claims appended hereto.

What is claimed:

1. A pressure vessel, comprising:
a non-conductive polymeric pressure vessel liner; and
a one-piece composite boss comprising an electrically conductive fibrous or filamentous material; wherein:
the non-conductive liner is contiguous to an inner surface of the composite boss, separating the inner surface of the boss from a compressed fluid contained in the pressure vessel; and
the non-conductive liner is also contiguous to a proximal end surface of the boss, physically and electrically separating the end surface from galvanic corrosion-inducing contact with materials external to the pressure vessel.

2. The pressure vessel of claim 1, wherein the non-conductive liner comprises a dielectric polymer.

3. The pressure vessel of claim 2, wherein the dielectric polymer is a thermoplastic polymer.

4. The pressure vessel of claim 3, wherein the thermoplastic polymer comprises polyethylene.

5. The pressure vessel of claim 2, wherein the dielectric polymer is a thermoset polymer.

6. The pressure vessel of claim 5, wherein the thermoset polymer is made from a prepolymer formulation comprising at least 92% pure dicyclopentadiene.

7. The pressure vessel of claim 1, wherein the composite boss comprises a thermoset polymer matrix.

8. The pressure vessel liner of claim 7, wherein the thermoset polymer matrix is selected from the group consisting of epoxy resins, polyester resins, vinyl ester resins, polyimides, dicyclopentadiene resins and combinations thereof.

9. The pressure vessel of claim 8, wherein the thermoset polymer matrix is made from a prepolymer formulation comprising at least 92% pure dicyclopentadiene.

10. The pressure vessel of claim 1, wherein the electrically conductive fibrous or filamentous material comprises carbon fibers or filaments.

11. The pressure vessel of claim 1, wherein the vessel is used for the containment and transport of compressed natural gas (CNG).

12. The pressure vessel of claim 11, wherein the CNG comprises raw natural gas.

13. A vehicle fitted with a pressure vessel according to claim 1.

14. The vehicle of claim 13, wherein the vehicle is a ship.

* * * * *